(12) United States Patent
Matoba et al.

(10) Patent No.: US 10,220,635 B2
(45) Date of Patent: Mar. 5, 2019

(54) PRINTING DEVICE AND COLOR DEVELOPMENT CONTROLLING METHOD

(71) Applicant: MIMAKI ENGINEERING CO., LTD., Nagano (JP)

(72) Inventors: Yusaku Matoba, Nagano (JP); Yoshihiro Ibuki, Nagano (JP); Shunsuke Akuta, Nagano (JP); Tomohiro Takano, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 15/700,183

(22) Filed: Sep. 11, 2017

(65) Prior Publication Data
US 2018/0072070 A1    Mar. 15, 2018

(30) Foreign Application Priority Data
Sep. 13, 2016 (JP) .................. 2016-179014

(51) Int. Cl.
| | |
|---|---|
| *B41J 2/14* | (2006.01) |
| *B41J 2/21* | (2006.01) |
| *B41J 3/407* | (2006.01) |
| *B41J 11/00* | (2006.01) |
| *D06P 5/30* | (2006.01) |
| *B41F 33/00* | (2006.01) |
| *B41J 2/365* | (2006.01) |
| *B41J 2/005* | (2006.01) |
| *G06T 11/00* | (2006.01) |

(52) U.S. Cl.
CPC ......... *B41J 2/2132* (2013.01); *B41J 2/14088* (2013.01); *B41J 2/2103* (2013.01); *B41J 3/4078* (2013.01); *B41J 11/002* (2013.01); *D06P 5/30* (2013.01); *B41F 33/0045* (2013.01); *B41J 2/365* (2013.01); *B41J 2002/0055* (2013.01); *G06K 2215/0094* (2013.01); *G06T 11/001* (2013.01)

(58) Field of Classification Search
CPC ...... B41J 11/002; B41J 13/02; B41J 11/0005; B41J 3/4078
USPC .................. 347/16, 17, 40, 43, 102
See application file for complete search history.

(56) References Cited

U.S. PATENT DOCUMENTS

2011/0267393 A1    11/2011    Okamoto

FOREIGN PATENT DOCUMENTS

| | | |
|---|---|---|
| JP | 2001334647 | 12/2001 |
| JP | 2002011860 | 1/2002 |

(Continued)

OTHER PUBLICATIONS

"Search Report of European Counterpart Application," dated Feb. 12, 2018, p. 1-p. 8.

*Primary Examiner* — An H Do
(74) *Attorney, Agent, or Firm* — JCIPRNET

(57) ABSTRACT

To appropriately color develop ink according to a print condition even when carrying out the printing step and the color developing step in a series of steps. A printing device includes a printing machine that discharges an ink to a print medium and a color developing machine that heats the print medium, on which the ink discharged by the printing machine is attached, to color develop the ink. The printing device includes a controller that adjusts at least one of a heating time and a heating temperature of the print medium by the color developing machine according to at least one of a transporting speed of the print medium transported from the printing machine and an amount of the ink which is discharged.

10 Claims, 10 Drawing Sheets

(56) References Cited

FOREIGN PATENT DOCUMENTS

| | | |
|---|---|---|
| JP | 2011058130 | 3/2011 |
| WO | 2008069070 | 6/2008 |

PRINTING DEVICE AND COLOR DEVELOPMENT CONTROLLING METHOD

CROSS REFERENCE TO RELATED APPLICATIONS

This application claims the priority benefit of Japanese Patent Application No. 2016-179014, filed on Sep. 13, 2016. The entirety of the above-mentioned patent application is hereby incorporated by reference herein and made a part of this specification.

TECHNICAL FIELD

The present disclosure relates to a printing device and a color development controlling method.

DESCRIPTION OF THE BACKGROUND ART

A color developing machine that discharges ink to a print medium such as a cloth with an inkjet printer to carry out printing, and thereafter, color develops the ink attached to the print medium is known.

In a color developing step using the color developing machine, the print medium in which printing is finished and wound into a roll form is attached to a feed roller of the color developing machine, the print medium fed out from the feed roller is brought into contact with a heat generating roller to heat the print medium, and the heated print medium is wound with a winding roller (see e.g., Japanese Unexamined Patent Publication No. 2011-58130).

Attempts are also being made to carry out the printing step and the color developing step in a series of steps to enhance efficiency. In other words, the print medium is transported to the color developing machine as is without being rolled into a roll form after the printing, and the print medium is wound after the color developing step, so that the work between the printing step and the color developing step can be omitted.

Patent Literature 1: Japanese Unexamined Patent Publication No. 2011-58130

SUMMARY

However, the transporting speed of the print medium and the amount of ink attached to the print medium differ depending on the print conditions (resolution, path, size of stagger, etc.). Thus, when carrying out the printing step and the color developing step in a series of steps, as the heating time of the print medium in the color developing machine depends on the transporting speed of the print medium in the printing step, the heating time may become insufficient and the ink may not be sufficiently color developed in the color developing machine depending on the print conditions, or the print medium may be heated more than necessary and the print medium may become dirty from the vapor of the ink.

In view of the problems described above, the present disclosure provides a printing device and a color development controlling method that can appropriately color develop the ink according to the print condition even when the printing step and the color developing step are carried out in a series of steps.

To solve the problem described above, the present disclosure provides a printing device including a printing machine that discharges an ink to a print medium; a color developing machine that heats the print medium, on which the ink discharged by the printing machine is attached, to color develop the ink; and a controller that adjusts at least one of a heating time and a heating temperature of the print medium by the color developing machine according to at least one of a transporting speed of the print medium transported from the printing machine and an amount of the ink which is discharged.

Therefore, although the transporting speed of the print medium and the amount of discharged ink differ depending on the print condition of the printing machine, the ink attached to the print medium can be color developed at an appropriate condition according to the print condition by adjusting at least one of the heating time and the heating temperature of the print medium according to at least one of the transporting speed and the amount of the ink which is discharged.

The printing device further preferably includes a heater that generates heat by electric conduction and heats the print medium; where the controller preferably adjusts an electric conducting amount to the heater according to at least one of the transporting speed of the print medium and the amount of the ink which is discharged.

Thus, the heating temperature of the print medium can be adjusted by adjusting the electric conducting amount to the heater according to at least one of the transporting speed of the print medium and the amount of the ink which is discharged. The transporting speed changes a time staying in the color developing machine and the amount of ink changes an integral heating amount necessary for color development, and hence an optimum color development control can be realized by adjusting the heating temperature according to the transporting speed and the amount of ink.

Furthermore, the controller preferably increases the electric conducting amount to the heater as the transporting speed of the print medium becomes faster.

As the heating time by the color developing machine becomes shorter when the transporting speed of the print medium becomes faster, the lack of heating of the print medium can be compensated by increasing the electric conducting amount to the heater.

Moreover, the controller preferably increases the electric conducting amount to the heater as a discharging amount of the ink to the print medium becomes greater.

As the necessary heating time by the color developing machine becomes longer when the discharging amount of ink to the print medium becomes greater, the lack of heating of the print medium can be compensated by increasing the electric conducting amount to the heater.

The printing device further preferably includes a plurality of heaters that generate heat by electric conduction and heat the print medium; where the controller independently controls an electric conducting amount for every plural sets of heaters, and adjusts the electric conducting amount of the heater of each set according to at least one of the transporting speed of the print medium and the amount of the ink which is discharged.

Thus, the controller can control the heaters of plural sets independent from each other, whereby the heating condition in the color developing machine can be more finely adjusted according to the print condition.

The printing device further preferably includes a storage portion that stores a preset transporting speed of the print medium, a length of a transportation path in which the print medium is heated, and a heating time of the print medium; and a calculator that calculates a time which the print medium passes the transportation path from the transporting speed and the length of the transportation path stored in the storage portion; where the controller preferably reduces the electric conducting amount of the heaters of a part of sets, when the passing time calculated by the calculator exceeds the heating time stored in the storage portion.

Thus, when the passing time calculated by the calculator exceeds the heating time stored in the storage portion, the electric conducting amount of the heaters of a part of sets is reduced to suppress excessive heating of the print medium.

Furthermore, when starting a cleaning of a recording head that discharges the ink, the controller preferably determines whether or not a color development of the print medium by the color developing machine is being carried out, and when the color development of the print medium s being carried out, the print medium is transported toward the color developing machine, and when the color development of the print medium is not being carried out, a transportation of the print medium is stopped.

Thus, although the printing is once stopped when starting the cleaning of the recording head, if the color development by the color developing machine is being carried out even if the recording head is evacuated and the printing is stopped, the transportation of the print medium is continued so that the print medium being color developed does not become a waste. If the color development by the color developing machine is not being carried out, the waste of the print medium can be suppressed by stopping the transportation of the print medium.

The color developing machine further preferably includes a heater that generates heat by electric conduction and heats the print medium; and the controller preferably starts the electric conduction to the heater when receiving a print data for the print medium.

Thus, the controller starts the electric conduction to the heater when receiving the print data, so that the heater can be heated to a temperature sufficient for color development by the time the print medium is transported to the color developing machine, and the efficiency of the working step can be enhanced.

To solve the problem described above, the present disclosure provides a color development controlling method that color develops an ink on a print medium, on which the ink discharged by a printing machine is attached, with a color developing machine. The color development controlling method comprises adjusting at least one of a heating time and a heating temperature of the print medium by the color developing machine according to at least one of a transporting speed of the print medium transported from the printing machine or an amount of the ink which is discharged.

Therefore, although the transporting speed and the amount of discharged ink of the print medium differ depending on the print condition of the printing machine, the ink attached to the print medium can be color developed at an appropriate condition according to the print condition by adjusting at least one of the heating time and the heating temperature of the print medium according to at least one of the transporting speed and the amount of the ink which is discharged.

According to the present disclosure, the ink can be appropriately color developed according to various print conditions even when carrying out the printing step and the color developing step in a series of steps.

DETAILED DESCRIPTION OF EMBODIMENTS

Hereinafter, an embodiment of the present disclosure will be described with reference to the drawings.

Figure 1:
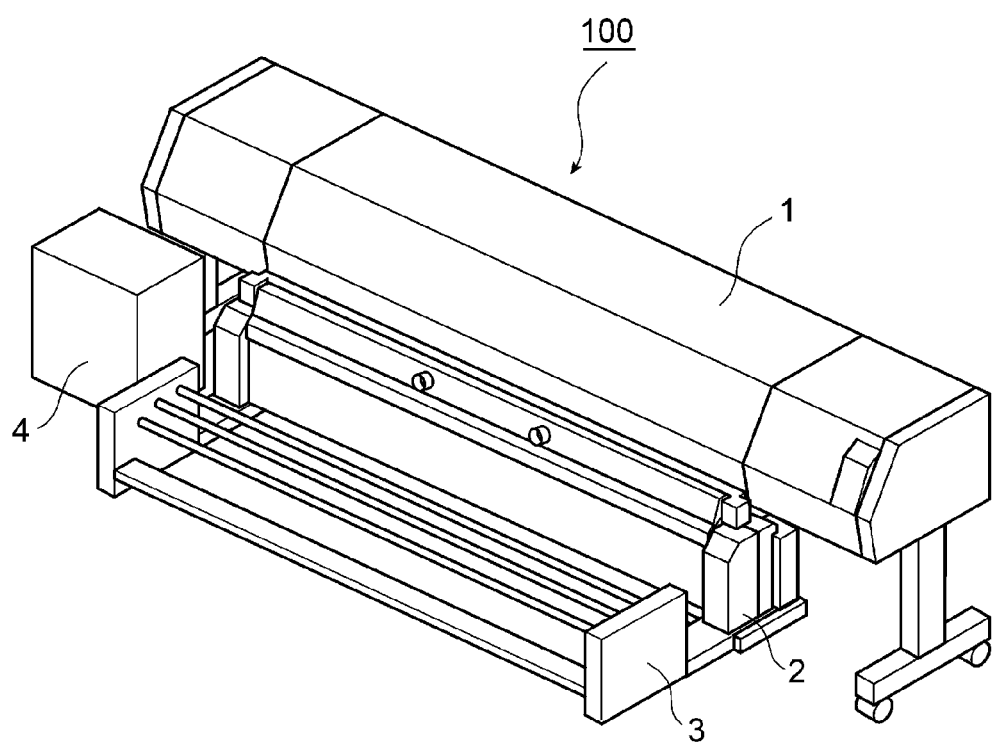
FIG. 1 is a perspective view of a printing device including a printing machine and a color developing machine.

As shown in FIG. 1, a printing device 100 includes a printing machine 1, a color developing machine 2, a winding device 3, and an ink supplying device 4. The printing machine 1 is, for example, an inkjet printer, and discharges ink from a recording head toward a print medium, and attaches the ink to the print medium. The color developing machine 2 heats the print medium, on which the ink is attached, and color develops the ink attached to the print medium. The winding device 3 winds the print medium in which the ink is color developed into a roll form. The ink supplying device 4 supplies ink to the printing machine 1. The printing device 100 has the printing machine 1 arranged on a most upstream side of a transportation path of the print medium, and the color developing machine 2 and the winding device 3 arranged side by side toward a downstream side of the transportation path of the print medium in such order. The ink supplying device 4 is arranged on a side (one end side in a width direction) of the printing machine 1.

<Printing Machine>

Figure 2:
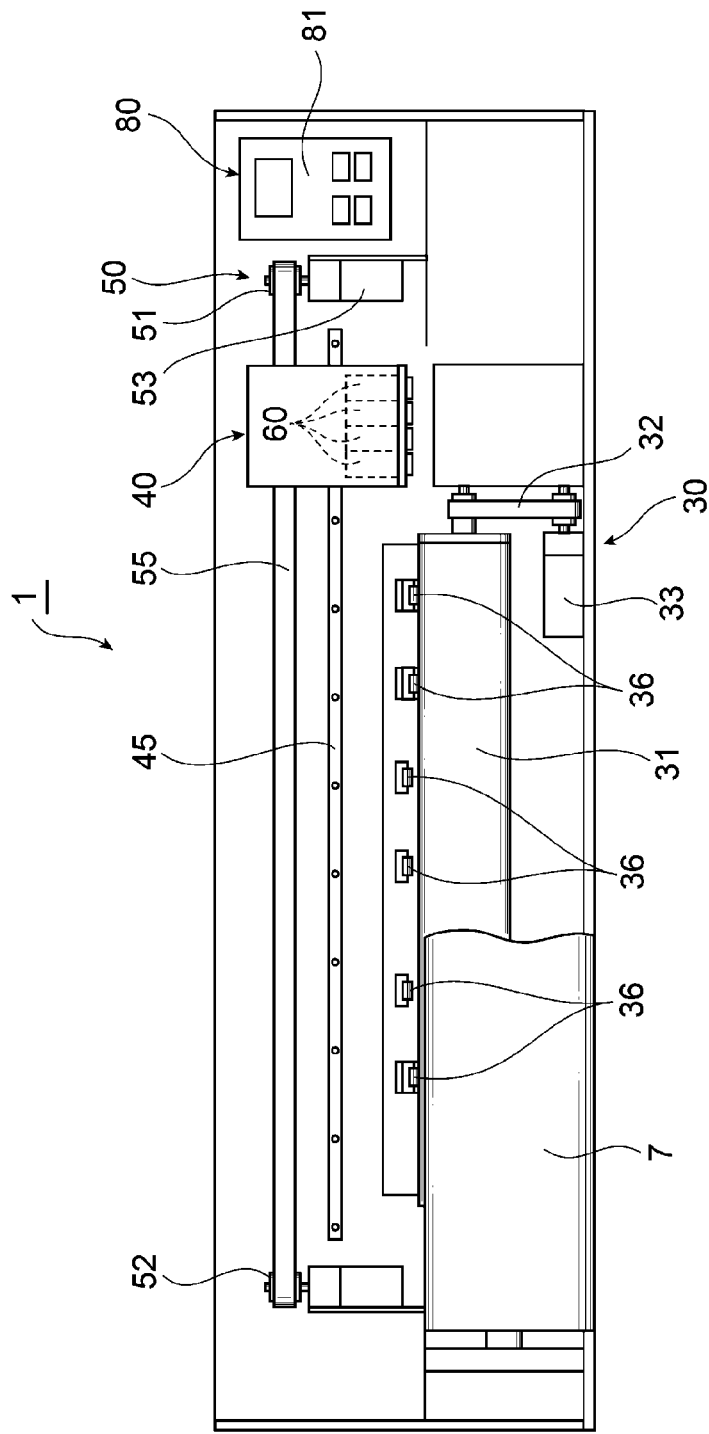
FIG. 2 is a front view in which one portion of the printing machine is enlarged.
Figure 3:
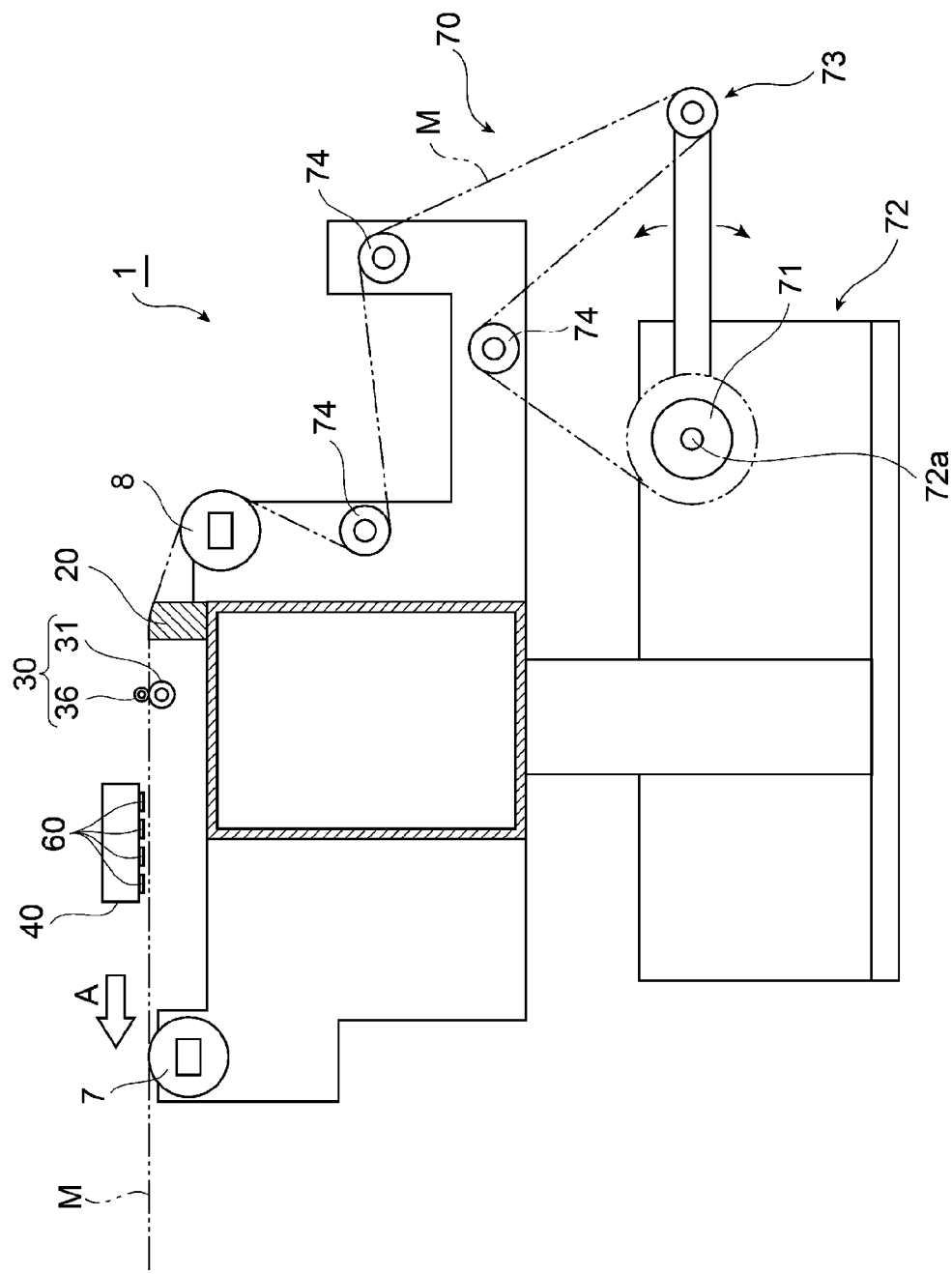
FIG. 3 is a side view showing an outline of the printing machine.
Figure 4:
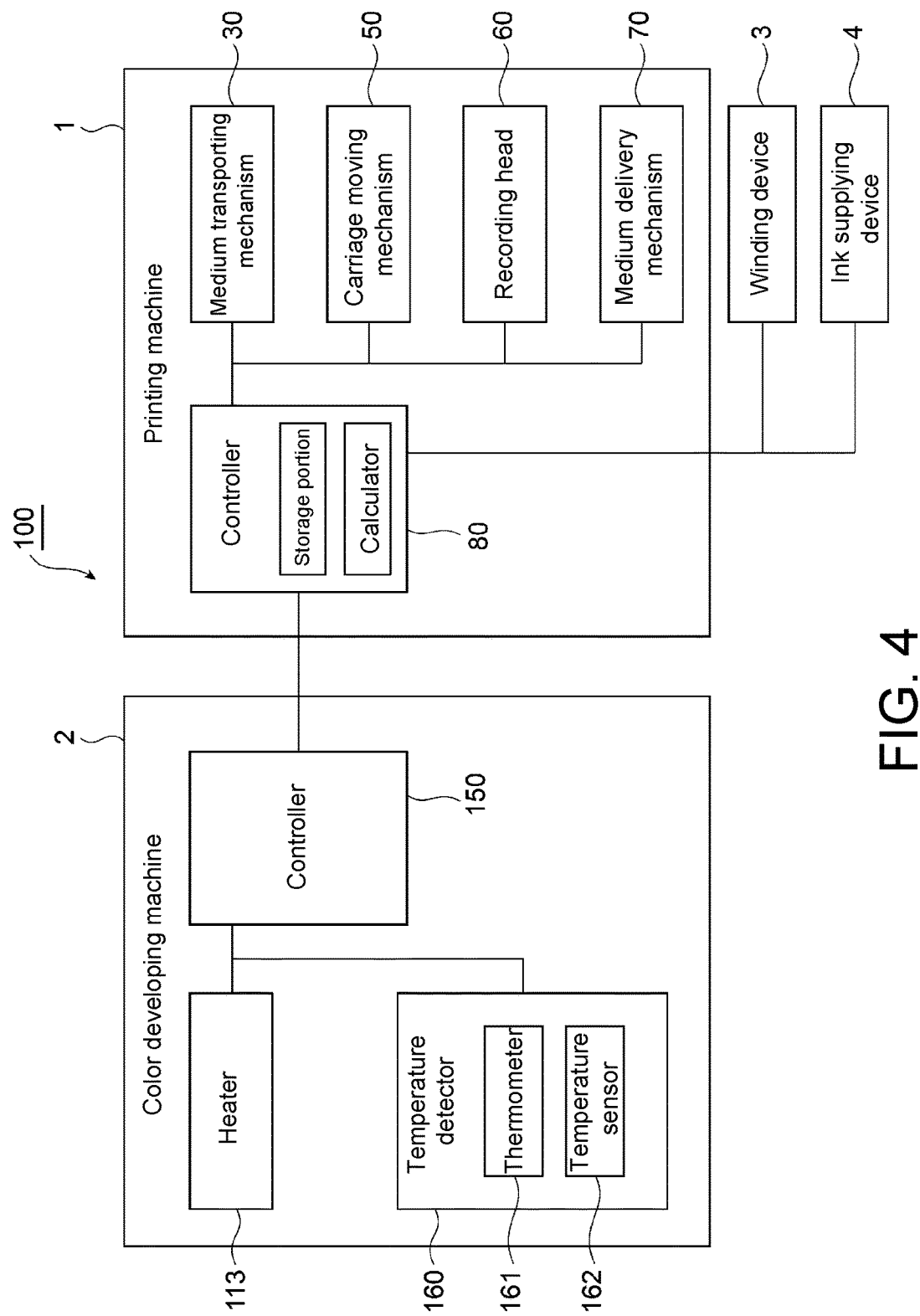
FIG. 4 is a block diagram describing a configuration controlled by a controller of the printing device.

As shown in FIGS. 2 to 4, the printing machine 1 includes a medium supporting portion 20, a medium transporting mechanism 30, a carriage 40, a carriage moving mechanism 50, a recording head 60, a medium delivery mechanism 70, and a controller 80.

(Medium Supporting Portion)

The medium supporting portion 20 is arranged at a position between a brake roller 8 (to be described later) and the medium transporting mechanism 30 on the transportation path of a print medium M, and supports the print medium M at the relevant position and horizontally feeds the print medium M toward the medium transporting mechanism 30.

(Medium Transporting Mechanism)

The medium transporting mechanism 30 moves the print medium M supported by the medium supporting portion 20 back and forth. The medium transporting mechanism 30 is configured to include a cylindrical feed roller 31 turnably provided about a turning shaft extending to the left and right, and a plurality of pinch rollers 36 elastically engaged with the feed roller 31, where the print medium M is transported in a predetermined direction by a feeding amount corresponding to a rotation angle of the feed roller 31, that is, the feeding amount corresponding to a drive control value output from the controller 80 by turning the feed roller 31 with the print medium M sandwiched between upper and lower rollers 36, 31.

As a mechanism for driving, it is configured including a servo motor 33 that rotatably drives the feed roller 31, a timing belt 32 that is bridged across a driven pulley coupled to a shaft end of the feed roller 31 and a drive pulley coupled to a shaft end of the servo motor 33, and the like.

As shown in FIG. 3, the print medium M is transported in air between the medium transporting mechanism 30 and a tension roller 7, and the ink is discharged from the recording head 60 with respect to the print medium M to carry out printing. In this case, a constant tension is applied on the print medium M by the tension roller 7 and the brake roller 8. The transporting direction of the print medium M is indicated with an arrow A.

(Carriage, Carriage Moving Mechanism, Recording Head)

The carriage 40 supports the recording head 60, and is supported by a guide rail 45 so as to be located on an upper side of the medium supporting portion 20 and freely movable to the left and right.

The carriage moving mechanism 50 relatively moves the carriage 40 to the left and right with respect to the print medium M transported in air. The carriage moving mechanism 50 includes a drive pulley 51 and a driven pulley 52 arranged in the vicinity of left and right side ends of the guide rail 45, a servo motor 53 that rotatably drives the drive pulley 51, and an endless belt-like timing belt 55 bridged across the drive pulley 51 and the driven pulley 52, and is configured with the carriage 40 coupled and fixed to the timing belt 55. The rotation of the servo motor 53 is controlled by the controller 80, and the carriage 40 is moved to the left and right by a feeding amount corresponding to the drive control value output from the controller 80 to the servo motor 53.

The recording head 60 is arranged with a predetermined gap from the print medium M on a lower surface of the carriage 40. The recording head 60 is forming with a nozzle row, in which a great number of nozzles that respectively injects microscopic ink particles are linearly lined in a front and back direction, lined in parallel.

(Medium Delivery Mechanism)

The medium delivery mechanism 70 includes a supporting portion 72 that supports a tubular winding tube 71, around the periphery of which the print medium M in a non-processed state is wound to a roll form, in a freely rotatable and removable manner, a first tension applying portion 73 that applies a tension (tensile force) in a direction opposite the transporting direction on the print medium M between the winding tube 71 and the brake roller 8, and a plurality of guide rollers 74 that smoothly guide the print medium M supplied from the winding tube 71 to the brake roller 8. The supporting portion 72 includes a shaft portion 72*a* fixed to the winding tube 71 and a stepping motor (not shown) in which the shaft portion 72*a* is coupled to a rotation shaft, and delivers the print medium M by a delivery amount corresponding to a drive control value output from the controller 80 to the stepping motor.

(Controller)

The controller 80 controls the drive of each portion of the printing machine 1 such as the front and back movement of the print medium M by the medium transporting mechanism 30, the left and right movement of the carriage 40 by the carriage moving mechanism 50, the ink injection from each nozzle of the recording head 60, the delivery operation of the print medium M in a non-processed state by the medium delivery mechanism 70, and the like. The controller 80 combines the front and back movement of the print medium M by the medium transporting mechanism 30 and the left and right movement of the carriage 40 by the carriage moving mechanism 50 to relatively move the print medium M and the recording head 60, and discharges the ink from each nozzle of the recording head 60 to the print medium M to print characters, figures, and the like corresponding to the print program and the print data.

The controller 80 includes a memory (storage portion) that stores a preset and recommended temperature of a transportation path 114, heating time of the print medium M, and ink density, and the controller 80 carries out various computations using the data stored in the memory.

The controller 80 is connected to an operation panel 81, to which the user carries out an input operation, which operation panel 81 includes a liquid crystal display for displaying various types of information, and various types of operation buttons such as a function key for selecting a function to set, a jog key for selecting an executing content, an enter key for inputting the selected content and a clear key for clearing the setting. Thus, the operator can set the print conditions while checking the display content of the liquid crystal display, and execute the printing.

Furthermore, as shown in FIG. 4, the controller 80 is communicably connected to a controller 150 of the color developing machine 2, to be described later, so that an electric conducting amount of a heater 113 of the color developing machine 2 can be adjusted with the controller 80 of the printing machine 1. The adjustment of the electric conducting amount does not only mean increasing/decreasing a current value to flow to the heater 113, and also includes stopping the electric conduction to the heater 113, turning OFF the power supply of the heater 113, and switching the power supply of the heater 113 from OFF to ON.

Furthermore, the controller 80 is connected to the winding device 3 and the ink supplying device 4 to control the drive of each device.

<Color Developing Machine>

The color developing machine 2 is arranged so as to be adjacent on the downstream side of the printing machine 1 (downstream side in the transporting direction of the print medium M).

Figure 5:
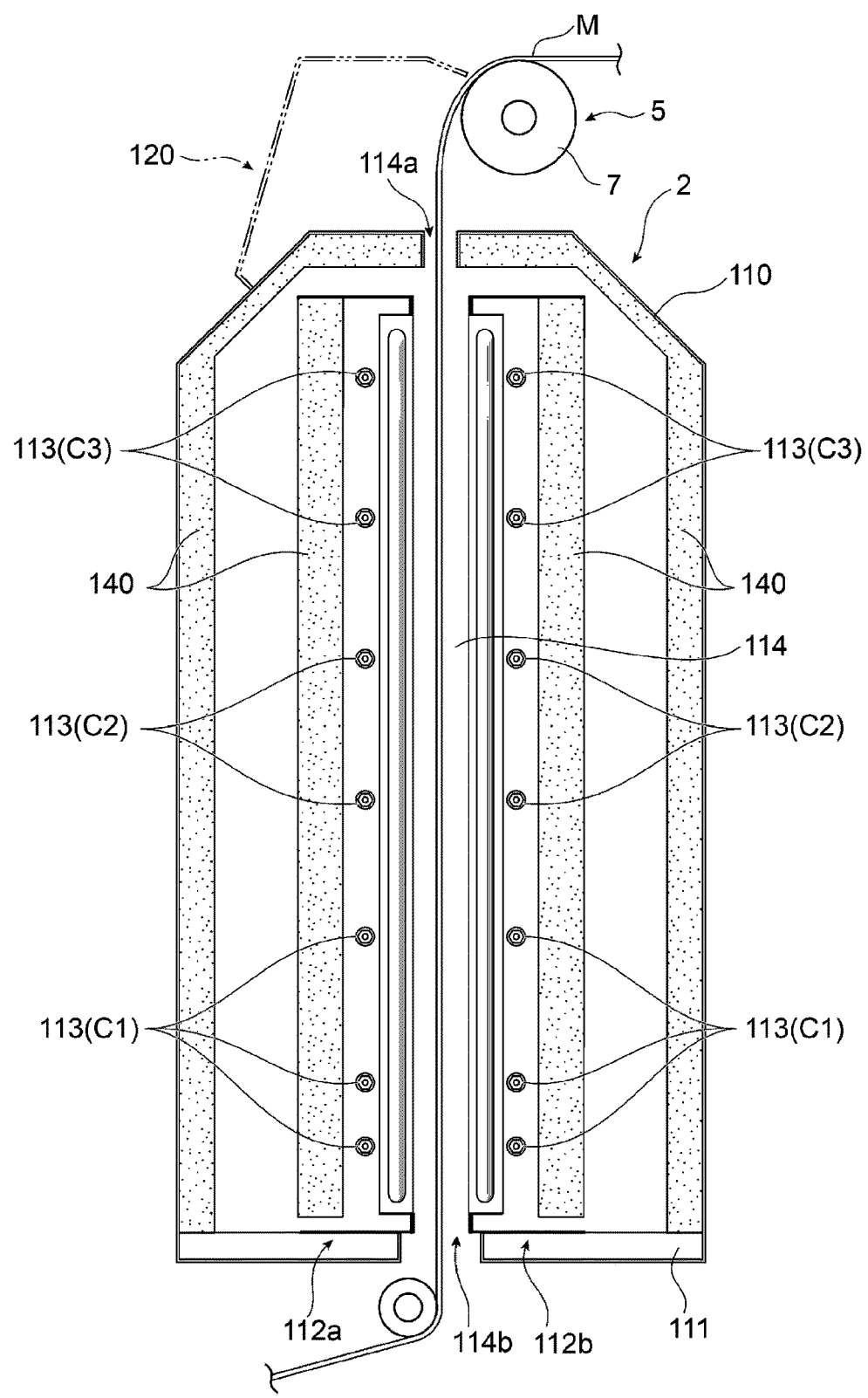
FIG. 5 is a view describing an internal structure of the color developing machine.
Figure 6:
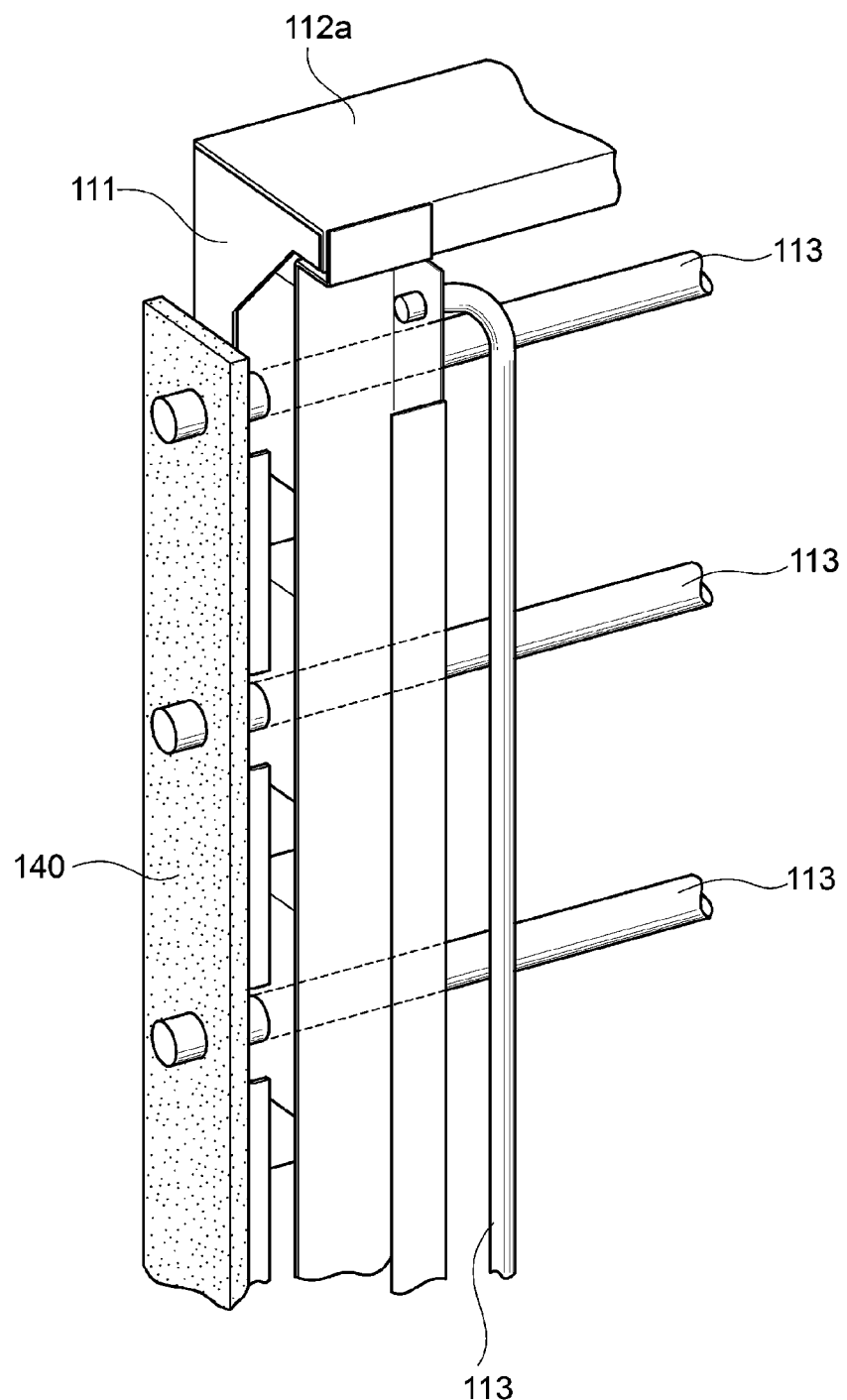
FIG. 6 is a view describing a structure of both ends of a heater.

As shown in FIGS. 4 to 6, the color developing machine 2 includes a color developer 110, an exhauster 120, a heat insulator 140, a controller 150, and a temperature detector 160.

(Color Developer)

The color developer 110 heats the print medium M, on which the ink is attached, transported from the printing machine 1 to color develop the ink.

The color developer 110 is arranged on a building frame 111, and includes two wall portions 112*a*, 112*b*, which face each other, a heating portion 113 arranged on each wall portion 112*a*, 112*b*, and the transportation path 114 of the print medium M.

As shown in FIG. 5, the wall portions 112*a*, 112*b* are arranged so as to face each other with an interval that at least allows the print medium M to be transported therethrough. The wall portions 112*a*, 112*b* are arranged on the building frame 111 such that the wall surface lies in a vertical direction.

A space formed between the wall portion 112*a* and the wall portion 112*b* is the transportation path 114 in which the print medium M is transported. When transporting the print medium M, the transportation path 114 is formed to an interval of an extent the print medium M does not make contact with the wall portions 112a, 112b. In other words, the wall portion 112a and the wall portion 112b are arranged to face each other with the transportation path 114 in between. The transportation path 114 is extended to lie along a direction intersecting a horizontal direction, for example, a vertical direction, where one end of the transportation path 114 is communicated to outside air toward the upper end side of the color developer 110, and the other end of the transportation path 114 is communicated to outside air toward the lower end side of the color developer 110. An opening on the upper end side in the transportation path 114 is a carry-in port 114a of the print medium M, and an opening on the lower end side is a carry-out port 114b of the print medium M.

The heating portion 113 is arranged on both the wall portion 112a and the wall portion 112b. The heating portion 113 is, for example, a heater 113 that generates heat by electric conduction and radiates heat to the periphery. The heater 113 is, for example, formed to a rod shape, where a plurality of heaters 113 are arranged on each wall portion 112a, 112b. As shown in FIG. 5, a part of heaters 113 are arranged so as to be lined in plurals with, for example, the longitudinal direction thereof lying along a width direction of the print medium M, that is, a direction orthogonal to the transporting direction of the print medium M. The heaters 113 arranged in a line along the width direction of the transportation path 114 are arranged at an equal interval excluding the heater 113 in the lowermost level. The heater 113 in the lower level is arranged so that the interval is shorter than the other heaters 113. This is because the heated air in the transportation path 114 moves upward, and hence the lowering in temperature is to be reduced as much as possible so that the inside of the transportation path 114 is not cooled by the air entering from the carry-out port 114b.

Furthermore, as shown in FIGS. 5 and 6, a part of heaters 113 are arranged so as to be lined in plurals with the longitudinal direction thereof lying along the transporting direction (direction of the transportation path 114) of the print medium M. Specifically, a total of two are arranged, one on each outer side of both ends of the heater 113 arranged along the width direction of the transportation path 114. This is to reduce the lowering of temperature as much as possible so that the inside of the transportation path 114 is not cooled by the air entering from both ends of the heater 113.

Thus, the transportation path 114 is in a state the periphery is surrounded by the heater 113, and has a structure in which the transportation path 114 is not easily cooled by the air entering from the periphery even if the air warmed by the heater 113 escapes upward from the carry-in port 114a.

(Exhauster)

The exhauster 120 discharges the air heated by the heater 113, and moved to the upper side of the carry-in port 114a from the inside of the transportation path 114 to the outside. The exhauster 120 is arranged in the vicinity of the upper end of each wall portion 112a, 112b.

(Heat Insulator)

The heat insulator 140 is provided so that the heat released from the heater 113 is not radiated as much as possible to the outside of the color developing machine 2. The heat insulator 140 is formed by, for example, felt. The heat insulator 140 is arranged on the building frame 111.

(Controller)

The controller 150 controls the drive of each portion of the color developing machine 2.

As shown in FIG. 4, the controller 150 controls ON/OFF, electric conducting amount, conducting time, and the like of the electric conduction to the heater 113 to control the heating of the print medium M of the transportation path 114. The controller 150 independently carries out heating control for every plural sets of heaters 113. Specifically, assuming two heaters 113 from the upper side form one set, and three heaters 113 form one set at the lowermost level, a total of three sets of heater groups are independently controlled. The controller 150 carries out the heating control so that the heating amount by the heater 113 group (C1, C2, C3), in which three heaters form one set at the lowermost level, becomes the largest. In other words, the lower side of the transportation path 114 can be strongly heated and the entering air can be warmed as fast as possible by having the electric conducting amount greater than the other sets or having the conducting time longer than the other sets. Furthermore, as the heated air moves upward, the heating amount of the other sets can be reduced.

The heating control by the controller 150 is not limited to being carried out such that the heating amount on the lower side becomes the largest, and an area of the heater 113 where the heating amount is to be the largest can be changed according to the print condition, the type of print medium M and the like.

(Temperature Detector)

The temperature detector 160 includes a thermometer 161 of a thermocouple, and the like that detects the temperature in the transportation path 114, and a contactless temperature sensor 162 that detects the temperature of the surface of the print medium M in the transportation path 114. Two temperature detectors 160 do not necessarily need to be provided, but the thermometer 161 and the temperature sensor 162 are used to carry out the temperature management more accurately.

The thermometer 161 and the temperature sensor 162 are, for example, arranged on the building frame 111.

The thermometer 161 and the temperature sensor 162 are both connected to the controller 150, and the controller 150 controls the electric conducting amount to the heater 113 according to the detected temperature.

<Winding Device>

The winding device 3 is configured similar to the medium delivery mechanism 70, and includes a winding tube (not shown) that winds the print medium M, on which printing is finished, into a roll form, and a supporting portion (not shown). The supporting portion includes a shaft portion (not shown) fixed to the winding tube, and a stepping motor (not shown) in which the shaft portion is coupled to a rotation shaft, and winds the print medium M by a winding amount corresponding to a drive control value output from the controller 80 to the stepping motor.

<Transportation Portion>

The print medium M is transported through the transportation path 114 of the color developing machine 2 by the delivery of the print medium M by the medium delivery mechanism 70, the transportation of the print medium M by the medium transporting mechanism 30, and the winding of the print medium M by the winding device 3. In other words, the printing machine 1 and the winding device 3 configure the transportation portion 5.

<Temperature Control of Heater, Heating Time Control of Print Medium According to Print Condition>

Next, the temperature control of the heater 113 and the heating time control of the print medium M according to the print condition will be described.

The color development of the ink attached to the print medium M depends on three parameters, the temperature of the transportation path 114, the heating time in the transportation path 114, and the density of the ink (amount of ink).

The controller 150 increases the electric conducting amount to the heater 113 if the temperature of the transportation path 114 measured by the thermometer 161 and the temperature of the print medium M measured by the temperature sensor 162 are lower than a preset temperature, and reduces the electric conducting amount to the heater 113 if the temperature is higher.

Figure 7:
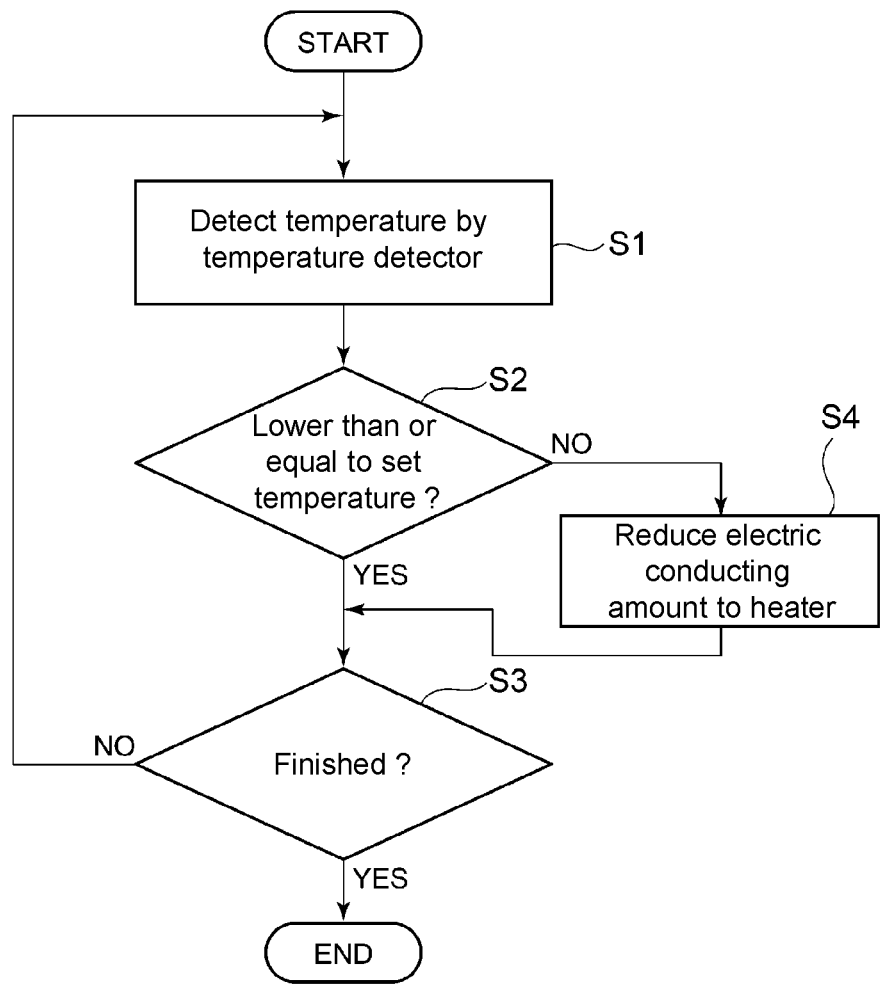
FIG. 7 is a flowchart describing a flow of temperature control of the heater according to a print condition.

Specifically, as shown in FIG. 7, when the temperature of the transportation path 114 and the surface of the print medium M is detected by the temperature detector 160 (step SD, the controller 150 determines whether or not the temperature detected by the temperature detector 160 is lower than or equal to the preset temperature (step S2). When the controller 150 determines that the detected temperature is lower than or equal to the preset temperature in step S2 (step S2: YES), the controller 150 determines whether or not the color development is finished (step S3), where the controller 150 terminates the process when determining that the color development is finished (step S3: YES), and returns to the process of step S1 when determining that the color development is not finished (step S3: NO). When the controller 150 determines that the detected temperature is not lower than or equal to the preset temperature in step S2 (step S2: NO), on the other hand, the controller 150 reduces the electric conducting amount to the heater 113 (step S4) as the temperature of the transportation path 114 or the print medium M is higher than necessary, and then proceeds to the process of step S3.

When the transporting speed of the print medium M is slow, the print medium stays in the color developing machine 2 for more than necessary, whereby the print medium M is damaged by heat, and the vapor from the ink is increased thus getting the print medium M dirty. In such a case, the heating time is adjusted by reducing the number of heaters 113 for heating the print medium M since the transporting speed of the print medium M, that is, the passing time of the print medium M in the transportation path 114 of the color developing machine 2 cannot be changed.

Figure 8:
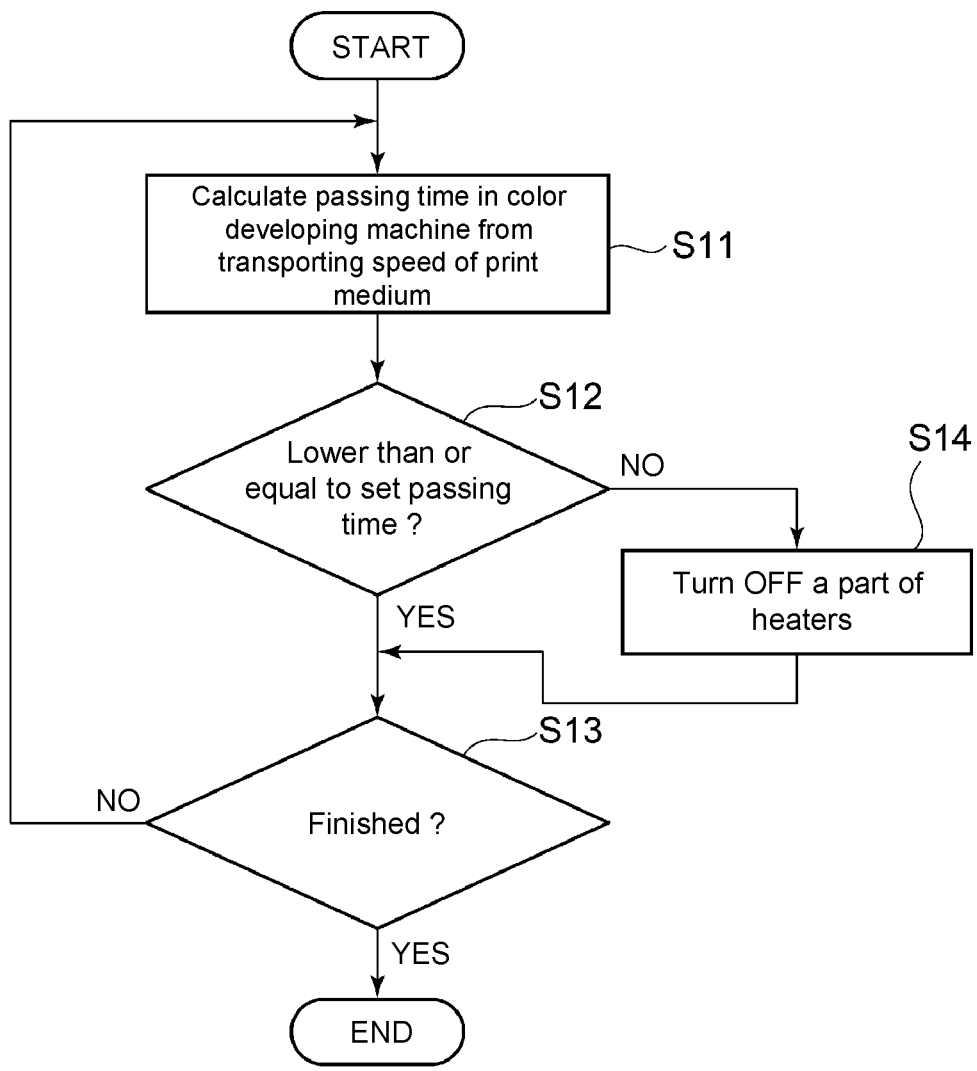
FIG. 8 is a flowchart describing a flow of heating time control of the print medium according to the print condition.

Specifically, as shown in FIG. 8, the controller 150 calculates the passing time in the color developing machine 2 from the transporting speed of the print medium M of the set print conditions (step S11). Then, the controller 150 determines whether or not the calculated passing time is smaller than or equal to a preset passing time (step S12).

When the controller 150 determines that the calculated passing time is smaller than or equal to the preset passing time in step S12 (step S12: YES), the controller 150 determines whether or not the color development is finished (step S13), where the controller 150 terminates the process when determining that the color development is finished (step S13: YES), and returns to the process of step S11 when determining that the color development is not finished (step S13: NO).

When the controller 150 determines that the calculated passing time is not smaller than or equal to the preset passing time in step S12 (step S12: NO), on the other hand, the controller 150 reduces the electric conducting amount to a part of sets of heaters 113 out of the plural sets of heaters 113 (step S14) as the time in which the print medium M is heated becomes longer than necessary, and then proceeds to the process of step S13. In step S14, the controller 150 greatly lowers the electric conducting amount to the heater 113 to the temperature the ink cannot develop color or shields the electric conduction to the heater 113.

As shown in FIG. 5, when controlling the electric conducting amount of the heater 113 with the controller 150, it is preferable to greatly lower the electric conducting amount in order from the set C1 of heaters 113 arranged on the lower side. In other words, the print medium M is heated using all the heaters 113 of sets C1, C2, and C3 when the resolution of the print medium M is high and the heating time of the print medium M is to be made long, the print medium M is heated using the heaters 113 of sets C2 and C3 when the heating time is to be made slightly short, and the print medium M is heated using only the heater 113 of set C3 when the heating time is to be greatly reduced.

<Control of Printing Machine and Color Developing Machine when Cleaning Printing Machine>

Next, the cooperation of the printing machine 1 and the color developing machine 2 in cleaning the recording head 60 of the printing machine 1 will be described. This control is necessary as the printing by the printing machine 1 and the color development by the color developing machine 2 are continuously carried out in a series of steps.

Figure 9:
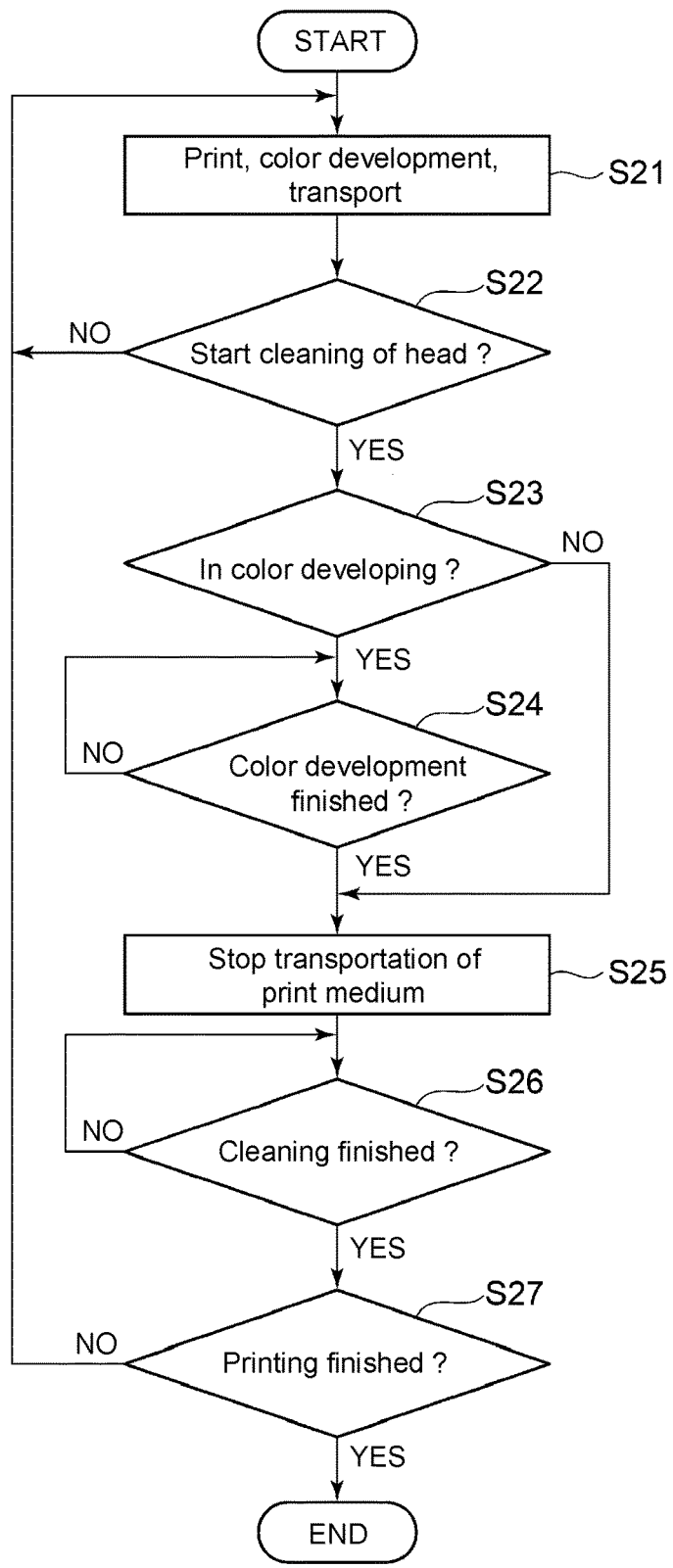
FIG. 9 is a flowchart describing a flow of control of the printing machine and the color developing machine when cleaning a recording head.

Specifically, as shown in FIG. 9, the controller 80 carries out the control of the printing machine 1, and the controller 150 carries out the control of the color developing machine 2 (step S21). The controller 80 determines whether or not the timing the cleaning of the recording head 60 is started is reached from the print condition set in advance (step S22). When the controller 80 determines it is the timing the cleaning is started in step S22 (step S22: YES), the controller 80 determines whether or not it is in the middle of the color development by the color developing machine 2 (step S23). When the controller 80 determines that it is in the middle of the color development by the color developing machine 2 in step S23 (step S23: YES), the controller 80 determines whether or not the color development in progress is finished (step S24). When the controller 80 determines that the color development is not being carried out in step S23 (step S23: NO), the controller 80 stops the drive of the servo motor 33 of the medium transporting mechanism 30 to stop the transportation of the print medium M (step S25). Similarly when the controller 80 determines that the color development in progress is finished in step S24 (step S24: YES), the controller 80 also carries out the process of step S25. When determining that the color development in progress is not finished in step S24 (step S24: NO), the controller 80 repeats the determination of step S24. In other words, the controller 80 continues the transportation of the print medium M without stopping.

The controller 80 then determines whether or not the cleaning is finished (step S26). When the controller 80 determines that the cleaning is finished in step S26 (step S26: YES), the controller 80 determines whether or not the printing is finished (step S27). When determining that the cleaning is not finished in step S26 (step S26: NO), the controller 80 repeats the determination of step S26.

The controller 80 terminates the process when the controller 80 determines that the printing is finished (step S27: YES), and the controller 80 returns to the process of step S21 when determining that the printing is not finished (step S27: NO).

The processes described above may be appropriately processed not only by the controller 80 of the printing machine 1 but also by the controller 150 of the color developing machine 2.

<Control of Heater Cooperatively Operating with the Printing Machine>

The control of the heater 113 of the color developing machine 2 corresponding to the situation of the printing machine 1 will now be described.

Figure 10:
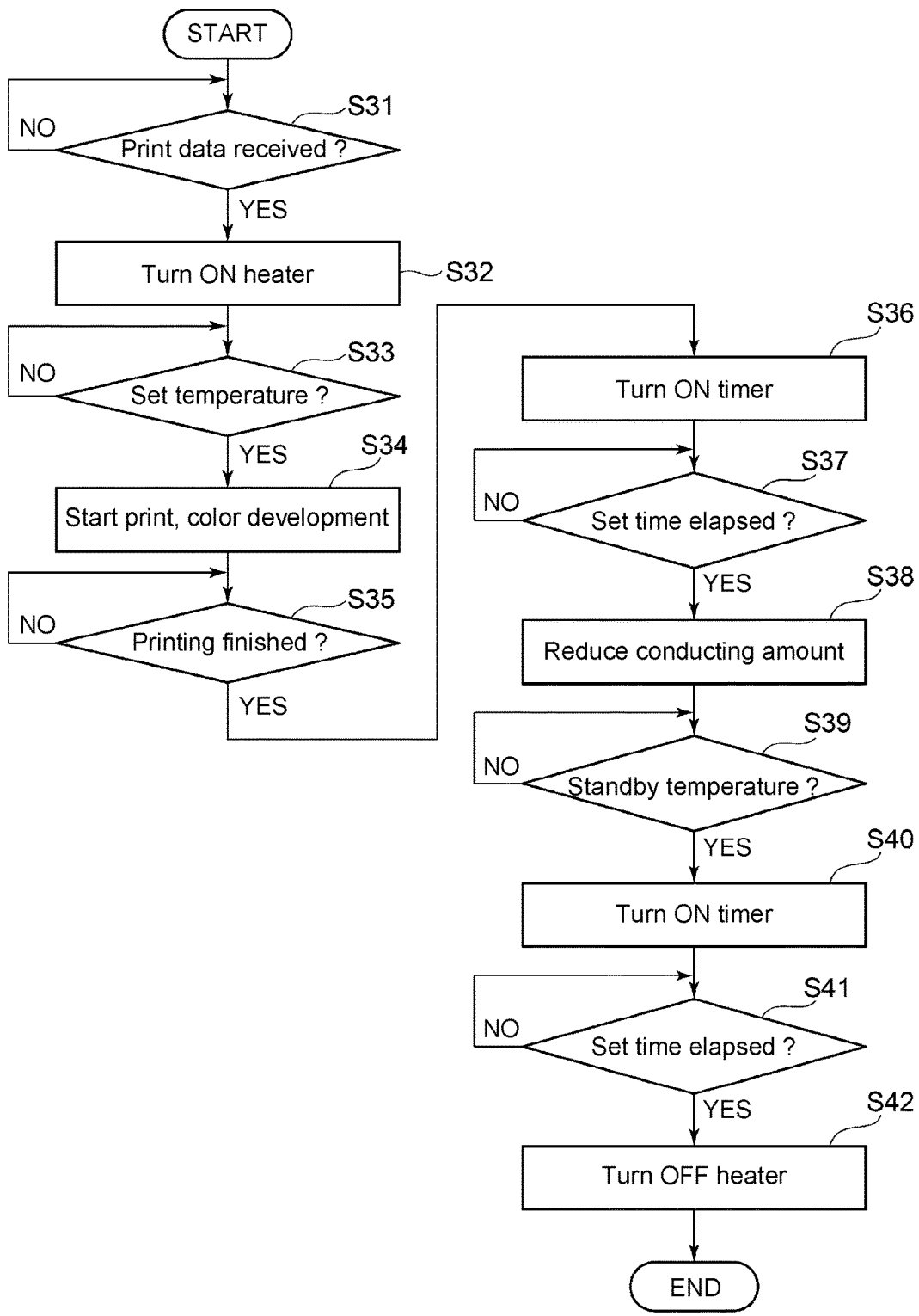
FIG. 10 is a flowchart describing a flow of control of the heater cooperatively operating with the printing machine.

As shown in FIG. 10, the controller 80 of the printing machine 1 determines whether or not the input print data is received (step S31). When the controller 80 determines that the print data is received in step S31 (step S31: YES), the controller 80 carries current to the heater 113 (step S32). When the controller 80 determines that the print data is not received (step S31: NO), the controller 80 repeats the process of step S31.

After starting the electric conduction to the heater 113, the controller 80 determines whether or not the transportation path 114 reached the set temperature based on the temperature detected from the thermometer 161 (step S33). When the controller 80 determines that the temperature of the transportation path 114 reached the set temperature in step S33 (step S33: YES), the controller 80 carries out the printing by the printing machine 1 and the color development of the ink of the print medium M by the color developing machine 2 in cooperation with the controller 150 (step S34).

The controller 80 then determines whether or not all the processing of the input print data are completed (step S35). When the controller 80 determines that all the processing of the input print data are completed in step S35 (step S35: YES), the controller 80 activates a timer to have the heater 113 in standby state (step S36). After activating the timer, the controller 80 determines whether or not a time set in the timer has elapsed (step S37). When the controller 80 determines that the time set in the timer has elapsed in step S37 (step S37: YES), the controller 80 reduces the electric conducting amount to the heater 113 (step S38). When the controller 80 determines that the time set in the timer has not elapsed (step S37: NO), the controller 80 repeats the determination of step S37. The standby state is when the electric conducting amount to the heater 113 is reduced and the heater 113 is maintained at low temperature by the controller 80, and it does not mean stopping the electric conduction and turning OFF the heater 113.

Next, the controller 80 determines whether or not the temperature of the transportation path 114 lowered to a standby temperature based on the temperature detected by the thermometer 161 (step S39). When the controller 80 determines that the transportation path 114 lowered to the standby temperature in step S39 (step S39: YES), the controller 80 activates the timer to turn OFF the heater 113 (step S40). When the controller 80 determines that the transportation path 114 is not lowered to the standby temperature (step S39: NO), the controller 80 repeats the determination of step S39.

After activating the timer to turn OFF the heater 113, the controller 80 determines whether or not the time set in the timer has elapsed (step S41). When the controller 80 determines that the time set in the timer has elapsed in step S41 (step S41: YES), the controller 80 stops the electric conduction to the heater 113 and turns OFF the heater 113 (step S42), and with this, terminates the present process. When the controller 80 determines that the time set in the timer has not elapsed (step S41: NO), the controller 80 repeats the determination of step S41.

The processes described above may be appropriately processed not only the by controller 80 of the printing machine 1 but also by the controller 150 of the color developing machine 2.

In the printing device 100 having the configuration described above, the controller 80 or the controller 150 adjusts at least one of the heating time and the heating temperature of the print medium M according to at least one of the transporting speed of the print medium M transported from the printing machine 1 and the amount of attached ink. Thus, even if the printing step and the color developing step are carried out in a series of steps, the ink can appropriately develop color according to various print conditions.

In other words, when the transporting speed of the print medium M is fast, the heating time becomes short and thus the print medium M is heated with the temperature of the heater 113 set slightly high, whereas when the transporting speed is slow, the heating time becomes long and thus the print medium M is heated with the temperature of the heater 113 set slightly low. Furthermore, when carrying out printing of high resolution, the amount of ink attached to the print medium M becomes large, and thus the print medium M is heated with the temperature of the heater 113 set slightly high, whereas when carrying out printing of low resolution, the amount of ink attached to the print medium M becomes small, and thus the print medium M is heated with the temperature of the heater 113 set slightly low.

When the transporting speed of the print medium M is fast, the heating time becomes short and thus the print medium M is heated using all the heaters 113 (C1, C2, and C3), whereas when the transporting speed is slow, the heating time becomes long and hence the print medium M is heated using only a part of heaters 113. When carrying out printing of high resolution, the amount of ink attached to the print medium M becomes large, and thus the print medium M is heated using all the heaters 113 so that the heating time becomes long, whereas when carrying out printing of low resolution, the amount of ink attached to the print medium M becomes small, and thus the print medium M is heated using only a part of heaters 113 (only C3, or C2 and C3) so that the heating time becomes short. When the heating time becomes too long, the print medium M becomes dirty with the vapor generated from the heated ink, and thus the temperature and the heating time of the heater 113 are preferably appropriately adjusted according to the material of the print medium M and the type of ink.

When carrying out the printing step and the color developing step in a series of steps using the printing device 100, the transportation of the print medium M needs to be stopped when cleaning the recording head 60. However, if the print medium M is in the middle of being color developed in the color developing machine 2, the controller 80 of the printing machine 1 continues the transportation of the print medium M and stops the transportation of the print medium M at the stage the color development by the color developing machine 2 is finished. Thus, when carrying out cleaning, the print medium M being color developed will not stay in the color developing machine 2 for a long time and be excessively heated, whereby the print medium M will not become dirty nor damaged, and the quality of the printed article is enhanced.

Furthermore, the controller 80 of the printing machine 1 starts the electric conduction to the heater 113 of the color developing machine 2 at the time point of receiving the print data, and controls the heater 113 so as to be maintained at a low temperature of an extent color development does not occur without completely turning OFF the heater 113 after the termination of the printing, and hence in the color developing step, the time until the heater 113 is heated to a predetermined temperature can be shortened, and the time required to complete all the steps can be shortened.

The present disclosure is not limited to the embodiment described above, and can be appropriately changed. The arrangement, shape, and the like of each portion of the printing machine and the color developing machine are arbitrary, and can be freely changed within a scope the functions described above can be exhibited.

For example, the extending direction of the transportation path 114 is not limited to the vertical direction, and may be the horizontal direction and a direction intersecting the vertical direction. Furthermore, the heater 113 does not need to be arranged on both wall portions 112a, 112b, and merely needs to be arranged on at least one wall portion 112a, 112b. The heater 113 may, of course, be arranged to surround the outer edge of the wall portion 112a, 112b, but if the output of each heater 113 is sufficiently large, a part of heaters 113 may be omitted. The number and the installation interval of the heaters 113 are arbitrary, and can be freely changed.

The controller 80 of the printing machine 1 may carry out the control of the color developing machine 2, and the controller 150 of the color developing machine 2 may carry out the control of the printing machine 1. Furthermore, the controller that controls the drive of the entire printing device 100 may control at least one of the printing machine 1 and the color developing machine 2. Furthermore, which controller, the controller 80 of the printing machine 1 or the controller 150 of the color developing machine 2, carries out each process can be freely determined.

The color developing machine 2 has a configuration of passing the print medium M along the vertical direction, but may have a configuration of passing the print medium M along the horizontal direction, or may have a configuration of passing the print medium M along a diagonal direction intersecting the vertical direction and the horizontal direction.

What is claimed is:

1. A printing device, comprising:
   a printing machine that discharges an ink to a print medium;
   a color developing machine which is disposed at a downstream side of the printing machine in a transporting direction of the print medium and heats the print medium which is transported from the printing machine and on which the ink discharged by the printing machine is attached, to color develop the ink; and
   a controller that adjusts at least one of a heating time and a heating temperature of the print medium by the color developing machine according to at least one of a transporting speed of the print medium transported from the printing machine and an amount of the ink which is discharged,
   wherein printing by the printing machine and developing by the color developing machine are continuously carried out,
   wherein the print medium in a non-processed state is wound to a roll form and is continuously conveyed in the transporting direction, and then
   the print medium after being printed by the printing machine is conveyed to a transportation path inside the color developing machine without being wound in the roll form and substantially without contacting the color developing machine.

2. The printing device according to claim 1, further comprising:
   a heater that generates heat by electric conduction and heats the print medium;
   wherein the controller adjusts an electric conducting amount to the heater according to at least one of the transporting speed of the print medium and the amount of the ink which is discharged.

3. The printing device according to claim 2, wherein
   the controller increases the electric conducting amount to the heater as the transporting speed of the print medium becomes faster.

4. The printing device according to claim 2, wherein
   the controller increases the electric conducting amount to the heater as a discharging amount of the ink to the print medium becomes greater.

5. The printing device according to claim 1, further comprising:
   a plurality of heaters that generate heat by electric conduction and heat the print medium,
   wherein the controller independently controls an electric conducting amount for every plural sets of heaters, and adjusts the electric conducting amount of the heater of each set according to at least one of the transporting speed of the print medium and the amount of the ink which is discharged.

6. The printing device according to claim 5, further comprising:
   a storage portion that stores a preset transporting speed of the print medium, a length of a transportation path in which the print medium is heated, and a heating time of the print medium; and
   a calculator that calculates a time which the print medium passes the transportation path from the transporting speed and the length of the transportation path stored in the storage portion,
   wherein the controller reduces the electric conducting amount of the heaters of a part of sets, when the passing time calculated by the calculator exceeds the heating time stored in the storage portion.

7. The printing device according to claim 1, wherein
   when starting a cleaning of a recording head that discharges the ink, the controller determines whether or not a color development of the print medium by the color developing machine is being carried out,
   when the color development of the print medium is being carried out, the print medium is transported toward the color developing machine,
   when the color development of the print medium is not being carried out, a transportation of the print medium is stopped.

8. The printing device according to claim 1, wherein
   the color developing machine includes a heater that generates heat by electric conduction and heats the print medium, and
   the controller starts the electric conduction to the heater when receiving a print data for the print medium.

9. A color development controlling method that color develops an ink on a print medium, on which the ink discharged by the printing machine contained in the printing device according to claim 1 is attached, with the color developing machine contained in the printing device according to claim 1, and the color development controlling method comprising:
   adjusting at least one of a heating time and a heating temperature of the print medium by the color developing machine according to at least one of a transporting speed of the print medium transported from the printing machine and an amount of the ink which is discharged.

10. The printing device according to claim 1, wherein
    one end of the transportation path is communicated to a carry-in port on an upper end side of the color developing machine, and the other end of the transportation path is communicated to a carry-out port on a lower end side of the color developing machine.

\* \* \* \* \*